United States Patent [19]
Finkle et al.

[11] 3,839,901
[45] Oct. 8, 1974

[54] METHOD AND APPARATUS FOR MEASURING VISCOSITY

[75] Inventors: Eugene D. Finkle, San Carlos, Calif.; James A. Patterson, Los Altos, Calif.

[73] Assignee: said Finkle, by said Patterson

[22] Filed: Nov. 17, 1972

[21] Appl. No.: 307,758

[52] U.S. Cl. .................................................. 73/54
[51] Int. Cl. ............................................. G01n 11/00
[58] Field of Search .............................. 73/54, 64.3

[56] References Cited
UNITED STATES PATENTS

| | | | |
|---|---|---|---|
| 3,439,529 | 4/1969 | Patterson | 73/64.3 |
| 3,479,864 | 11/1969 | Patterson | 73/64.3 |

Primary Examiner—Richard C. Queisser
Assistant Examiner—Joseph W. Roskos
Attorney, Agent, or Firm—Townsend & Townsend

[57] ABSTRACT

Viscosity of a fluid is determined relative to that of other fluids by treating the fluid with a plurality of symmetrical particles having a molecular lattice that is insoluble in the fluid. The initial swelling or contracting of the particles, in terms of pressure or volume change, provides an indication of the free energy of the fluid. Thereafter, any further increase in the particle volume at constant pressure or increase in particle pressure at constant particle volume, during constant volume flow of the fluid through the voids between the particles, is directly proportional to the viscosity of the fluid relative to the viscosity of a standard fluid treated with the same particles.

28 Claims, 4 Drawing Figures

PATENTED OCT 8 1974 3,839,901
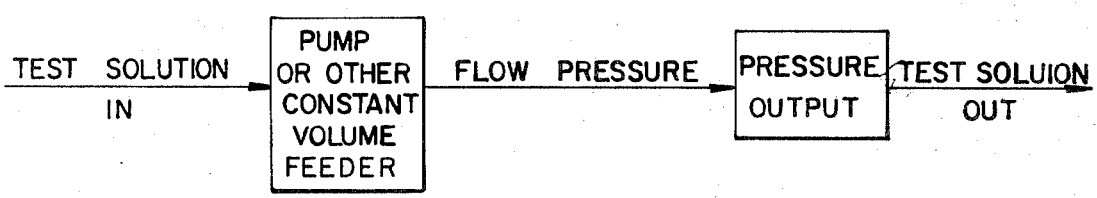
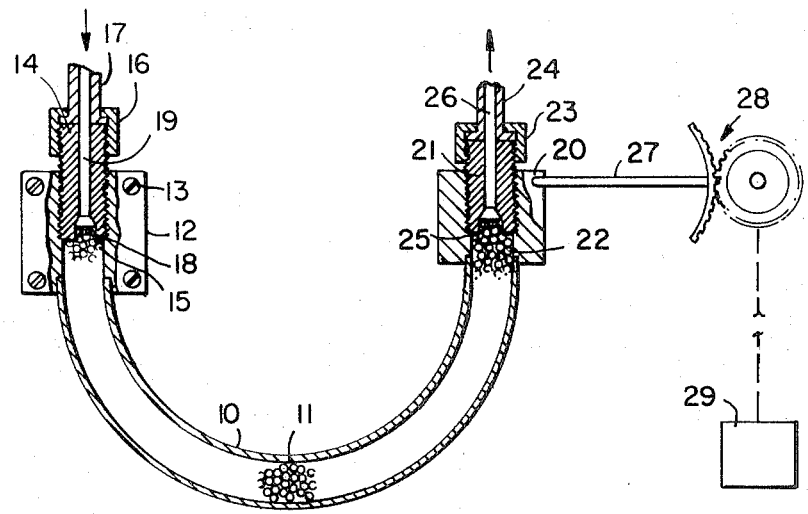
FIG_1
FIG_2
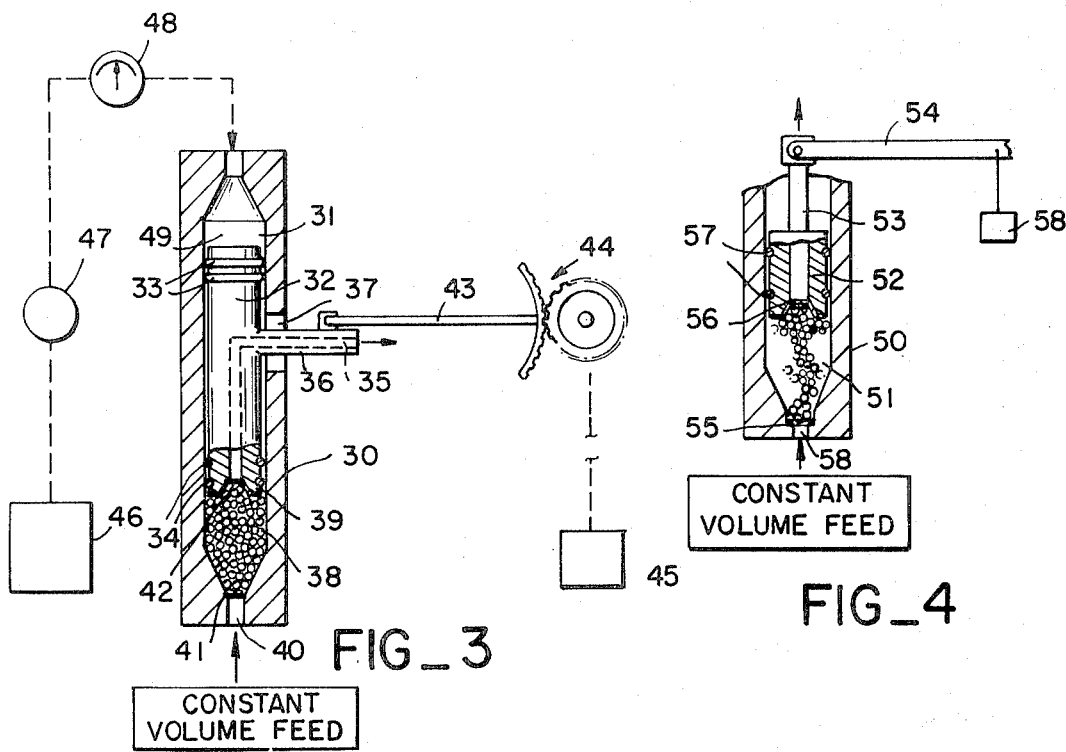
FIG_3
FIG_4

METHOD AND APPARATUS FOR MEASURING VISCOSITY

BACKGROUND OF THE INVENTION

This invention relates to a method and apparatus for obtaining a measurement proportional to the viscosity of a fluid relative to other fluids of known viscosity. The term "fluid" is used herein to include both gases and liquids. An accurate determination of the viscosity of fluid is particularly advantageous for the determination of molecular weights of polyelectrolytes, blood rheology and many related areas. A particular application of this invention involves monitoring human blood viscosity to determine adverse effects of birth control pills.

DESCRIPTION OF THE PRIOR ART

The swelling of suitable particles of, for example, cross-linked co-polymers such as those formed from polystyrene and divinyl benzene, is known and has been previously reported in the literature. Furthermore, U.S. Pat. No. 3,479,864 discloses a technique for the non-destructive measuring of the induced solid stress on a packaged bed of such suitable, fluid-sensitive materials in terms of solvation and swelling or contracting relative to the activity of the fluid. In that patent, it was disclosed that the change, or tendency to change, in dimensions of selective particles under solvating conditions was a quantitative expression of solvent free energy of the solvent or fluid system. By measuring the dimensional changes, for example, by one of several mechanical techniques described therein, data proportional to the free energy change in the system can be obtained. By obtaining similar data for a standard solvent or a fluid system in the same environment, absolute values for free energy can be readily calculated. That patent was directed to determining osmotic pressure or osmolarity of a fluid as well as the molecular weight of solute dissolved in the fluid.

The viscosity of a fluid is defined as the ratio of shearing stress applied to the rate of strain. Various conventional viscometer systems are currently employed to accomplish this measurement. They include capillary viscometers, rotary disc (or cylinder) viscometers, and falling ball (or rising bubble) viscometers. Each of these viscometry measuring systems has the flaw of "slippage" at the liquid-solid interface. This results from the necessity of applying force to the liquid in question. This force changes the hydration of the molecules in solution and alters the viscosity to be determined by an undefined amount.

SUMMARY OF THE INVENTION

The present invention involves the modification of the process and apparatus of the aforementioned U.S. Pat. No. 3,479,864. More particularly, by first determining the osmolarity of a fluid by the technique and apparatus set forth therein, and then subjecting the particles to subsequent constant volume fluid introduction, the bed of particles is further swollen (or contracted), thus providing a second volume reading, or, when tendency to change is measured, a second pressure reading. The difference between the second reading and the initial reading has been found to be directly proportional to the viscosity of the fluid being tested. By comparing this pressure (or volume) difference with the corresponding pressure (or volume) differential for a known solution, the actual viscosity of the fluid in question can be determined. The process and apparatus of this invention eliminates the prior art "slippage" of the liquid-solid interface. In addition, the practical advantages of the apparatus of this invention include simplicity, reliability, ruggedness, rapidity, ease of cleaning, economy, automation, portability among many others.

BRIEF DESCRIPTION OF THE DRAWINGS

Reference is made to the accompanying drawings wherein:

FIG. 1 shows a schematic flow in which the present invention is used for determining viscosity of a test solution.

FIG. 2 is a schematic side sectional view of one form of apparatus useful in applying the present invention to the measurement of viscosity.

FIG. 3 is a side sectional view, with parts broken away, illustrating an alternative embodiment for the measurement of viscosity.

FIG. 4 is a side sectional view showing part of another alternative embodiment for measuring viscosity in accordance with this invention.

The measurement of viscosity is based on Poiseullis' Law which states that for the steady laminar flow through a cylindrical tube of a Newtonian fluid, i.e., a fluid wherein the ratio of shearing stress applied to rate of strain is linear, the flow Q varies directly as the pressure difference and the fourth power of the radius ($r$) of the tube and varies inversely with the length ($1$) of the tube and the viscosity ($n$) of the fluid, as set forth in the following equation:

$$Q = (P^1 - P_1^1) r^4 / \pi / 8\, n1 \tag{1}$$

Thus it will be seen from the foregoing equation that where the flow Q is constant, the relative viscosity of two fluids will be proportional to the respective pressure drops $P^1$ and $P_1^1$. Carrying this analogy one step further, and applying it to a conventional Bourdon tube, a viscous liquid at a constant flow rate (Q) and temperature creates a pressure drop ($P-P_1$) in a capillary tube. This pressure drop will cause the straightening of a Bourdon tube proportional to the magnitude of ($P-P_1$), the Bourdon principle being a measure of pressure differential. In this manner, the relative viscosity of the two fluids can be determined by comparing their pressure drops. At a constant flow rate, the viscosity of a standard fluid and an unknown fluid bears the following relationship:

$$N_r = N/N^1 = P - P_1/P^1 - P_1^1 \tag{2}$$

wherein $N_r$ is relative viscosity, N is viscosity of the unknown fluid, $N^1$ is the viscosity of a standard solution, P equals the total pressure at constant flow rate for the unknown fluid, $P^1$ equals the total pressure at constant flow rate for the standard solution, while $P_1$ equals the osmotic pressure of an unknown and $P_1^1$ equals the osmotic pressure of the standard solution.

The heart of the system used in the present invention is fluid swellable symmetrical particles. The particles are preferably used in a chamber and the desired data is obtained from stress indications created in the particles by the particular solvent undergoing testing. If the particles are not symmetrical, geometrical packing changes during swelling and contraction can occur and stress indications observed will not be in strict proportion to the action of the solvent system. In the preferred case, therefore, particles in spherical form are utilized since they best avoid this problem. The spherical particles are preferably quite small and a relatively large number can be utilized in making an efficient operating device.

The particles resemble a system of curved parallel capillary tubes in which the walls of the tubes are the surfaces (osmotic membranes) of the spherical packed polymer particles. Perfect wetting requires zero velocity flow at the liquid-particle surface interface. Because the solvent is free to pass through these surfaces, zero velocity of fluid flow is created at the liquid-particle surface interface, i.e., $dv/dt = 0$.

Aside from a symmetrical configuration, a narrow range of size distribution of the several particles, together with uniformity of the chemical and physical characteristics of the particle are significant. Particularly rapid response is found to result from the use of particles with a diameter of 0.01–0.1 microns. The particles should preferably be non-deformable under the stress created over the free energy range attendant the contemplated use. For example, some solvation stresses can be as high as 3,000 atmospheres. The particles should preferably also have a uniform molecular matrix so that a uniform response to the solvent (and solute which may be contained therein) is obtained.

Of critical importance in all cases, the particles should be capable of solvating in the solvent system applied during conditions of observations so that the stresses sought are created. At the same time, the particles must not dissolve in the solvent system for obvious reasons.

Preferably, the particles should respond to both negative and positive solvent free energy changes with minimum hysteresis loops and this preferably should occur at a sufficiently rapid rate in response to reasonable flow rates of the fluids being measured. Hysteresis of the polymer particles (creation of different stress patterns during swelling or contracting from use to use) would obviously produce erroneous results. In other words, when utilizing spherical particles, changes in solvation free energy should preferably produce stresses within the particles which in turn produce only concentric expansion and contraction of the particles and this preferably should be of consistent magnitude for the same inducement from use to use. In some instances, particles which exhibit hysteresis may be used. For example, where measurement of particle expansion only is needed, hysteresis during contraction of the particle may be unimportant. Similarly, other deviations from the preferred properties may be tolerated where some error can be accepted.

A group of materials which substantially meet all of the preferred requirements discussed above are broadly classed as organic synthetic cross-linked resins. These materials are distinguished from linear or non-crosslinked polymers such as polyvinyl alcohol. Typical of the desired materials are those generally described in U.S. Pat. No. 2,366,007 to D'Alelio. These copolymers are formed by a conventional catalyzed polymerization reaction and are made from a monovinyl aryl compound such as styrene (vinyl benzene), vinyl toluenes, vinyl naphthalenes, vinyl ethyl benzenes, alpha-methyl styrene, vinyl chlorobenzenes and vinyl xylenes. The selected monomer is cross-linked with a suitable polyvinyl aryl compound, such as the divinyl benzenes, divinyl toluenes, divinyl naphthalenes, divinyl xylenes, divinyl ethyl benzenes, divinyl chlorobenzenes and divinyl-phenyl vinyl ethers. Excellent results for present purposes are obtained with particles formed from polystyrene cross-linked with divinyl benzene.

As described in the above-referenced patent and elsewhere, polymers of this type can be formed with or without fixed ionic groups such as sulfate groups attached to the polymer matrix. Particles containing fixed ionic groups solvate with aqueous fluids (both liquid and gas phase) whereas polymers free from fixed ionic groups are solvated by organic fluids. Therefore, when the test fluid is aqueous based, a polymer containing a fixed ionic group is employed whereas a polymer free from such ionic groups is employed when the test fluid is an organic solvent.

Examples of another group of useful cross-linked synthetic resins are those metal chelate forming resins such as those disclosed in U.S. Pat. No. 2,980,607 to R. A. Mock et al. The referenced patents are merely exemplary of the cross-linked synthetic resins which can be employed in the particles.

Aside from the preferred cross-linked synthetic organic resins, the method and apparatus of this invention contemplate the use of all particles which have a molecular lattice that is swellable but not soluble in the fluid being processed. In the broadest aspects of the invention, the particles may be derived from inorganic materials as well as the organic materials noted above. Examples of inorganic materials include silica gel which may be obtained in a spherical particulate form. See "Proc. Symposium Colston Research Society No. 10," p. 195, 1958 by A. V. Kiselev. Other inorganic materials include swellable clay ion exchangers such as bentonite and the montmorillonites. Inorganic ion exchangers such as the aluminas and hydroxylapatite are also useful and have the advantage of being available in a spherical form. Other useful inorganic particles comprise tungstic oxide and ferric oxide. While these materials are not spherical, they have reasonably good uniformity of geometry, the former particles being rod-like and the latter plate-like. Still other useful inorganic particles are included within the category of crystalline ion exchangers such as zirconium phosphate, zirconium tungstate, zirconium molybdate and hydrous zirconium oxide.

It will be appreciated that all of the potential useful particles, especially the inorganics, are not insoluble in all fluids. Accordingly, the particle should be selected with the nature of fluid being tested in mind.

With reference to FIG. 1 of the drawing, the general flow for practicing the present method using novel apparatus contemplates the input of a solution to be analyzed to a pump or a similar device for creating constant flow of fluid. Preliminary, and as disclosed by the aforementioned U.S. Pat. No. 3,479,864, free energy of the fluid is determined as disclosed therein. Thus, fluid under pressure is first passed through a relatively tightly packed bed of polymer particles such as described in connection with FIGS. 2, 3 and 4, where the fluid solvates the particles contained in the apparatus and stress changes in the particles are measured.

Thereafter, additional test solution is introduced at constant volume flow through the same devices such as that described in FIGS. 2, 3 and 4. The test solution is then discharged from the chamber containing the polymer particles. At this point the fluid can be used in any way desired, because the test fluid is in no way significantly changed by the procedure. It is therefore even suitable for further testing and analysis.

In FIG. 2, a Bourdon type tube 10 is filled with a plurality of spherical beads 11 formed, for example, by cross-linking styrene with divinyl benzene. The beads 11 are of substantially uniform diameters throughout tube 10 and are relatively closely packed to completely fill the tube and leave substantially no room for movement relative to each other.

At the left hand side of the figure, a stationary mounting bracket 12 can be affixed to any suitable surface and attached thereto by screws 13. A threaded inlet plug 14 is engaged with mounting 12 until it abuts with the inlet end 15 of tube 10. A connector 16 is threadably engaged with plug 14 to connect the apparatus with a conduit 17. Conduit 17 is in communication with a source of test fluid alternatively through a pump or other pressure feeding device (not shown) or through a constant volume pump. A porous retainer screen and ring assembly 18 is interposed between the inlet end 15 of tube 10 and inlet channel 19 of plug 14. The screen of assembly 18 permits input of test solution while preventing polymer beads 11 from backing up into channel 19 during swelling of the beads by test fluid.

At the right hand side of FIG. 2, tube 10 terminates in a free floating mounting 20. A plug 21 is threadably connected therein to abut with the discharge end 22 of tube 10. Mounting 29 may be suitably connected by means of a connector ring 23 to a discharge conduit 24 in a manner similar to that shown with respect to the input end of the tube. As before, a retainer screen and ring assembly 25 is inserted between discharge end 22 of tube 10 and discharge conduit 26 of plug 21 to prevent movement of beads 11 out of tube 10. Floating mounting 20 is connected to arm 27 and gear train 28. Movement of mounting 20 is translated through arm 27 and gear train 28 to any suitable electronic component or mechanical device such as an analytical balance represented by block 29.

In use, when fluid is first flowed at constant pressure through tube 10 and outwardly through discharge conduit 26, beads 11 will tend to swell or contract in relation to the change in free energy of the fluid. For example, if beads 11 are of the styrene-divinyl benzene type and contain a fixed ionic group such as a sulfate group, the fluid introduced is suitably aqueous in nature. If the aqueous fluid contains dissolved salts or other molecular species, the free energy of the fluid is decreased. Contact with the beads will result in an outflow of water from the beads (assuming that the beads had been solvated with water before introduction of the test fluid). The beads thereby are contracted and a decrease in stress on tube 10 will result. Arm 27 will be pulled upwardly with the amount of movement being observable on the instrument represented by block 29. Thereafter, fluid flow at constant volume results in a second observable movement of arm 27.

If water containing a decreased amount of dissolved salts or molecular species is then passed through the apparatus, its increased free energy content will have an opposite effect. Upon contact with beads 11 water will pass into the spherical polymers from the interparticle spaces which will thereby increase the internal water content of the beads. A hydration or solvation stress (pressure per unit area of bead surface) is caused by the increase in internal water and this pressure will be transmitted from bead to bead (assuming that the beads are sufficiently uniform in size and chemical composition) until all of the solvation stress is finally applied to the walls of tube 10. The pressure will cause tube 10 to move so that arm 27 is moved downwardly and again the change will be observable on the instrument represented by block 29. Again, fluid flow at constant volume results in a second observable movement of arm 27.

In accordance with the present discovery, the change of movement observable at block 29 between constant pressure flow and constant volume flow is directly proportional to the viscosity of the fluid. Therefore, if a standard of known activity is processed through the instrument and the read out component of block 29 calibrated therewith, values for viscosity of an unknown are readily obtainable. In addition, the apparatus of FIG. 2 is designed to operate under constant pressure by sensing the volume changes that occur upon passage of the test fluid through the bead bed.

The apparatus illustrated in FIG. 3 is designed to operate at constant volume by measuring positive and negative pressure changes applied to the bead bed needed to maintain or reattain the initial bead volume following contact with the test fluid. As such it includes a housing 30 defining a chamber 31 therein. A double ended piston 32 is inserted for movement up and down within chamber 31 and has pairs of substantially friction-free O-ring seals 33 and 34 at the opposite ends thereof. Piston 32 is made with a right angle channel 35 therethrough with an arm 36 normal to the main portion of piston 32 extending through an aperture 37 in housing 30. Aperture 37 is larger than the diameter of arm 36 so that up and down movement of piston 32 is permitted.

A plurality of cross-linked polymeric beads 38 are positioned in the lower end of chamber 31 between the bottom of piston 32 and inlet channel 40 of housing 30. As before, the beads are maintained in position between a pair of retention screens 41 and 42. Test fluid enters at inlet conduit 40 through screen 41, proceeds through the bead bed and thence out through right angle channel 35, as shown by the arrows. Again, a read out arm 43 is attached to arm 36 and includes a gear train 44 for translating the movement and transmitting it to a suitable read out component schematically illustrated by block 45.

The constant volume system of FIG. 3 includes a source of pressure 46, a valve 47, and a pressure gauge 48. In operation the unit is placed under pressure by opening valve 47 and permitting air to enter the top of chamber 31 to occupy area 49 and work against the top of piston 32. As the same time fluid (for example water containing no solute) is introduced at inlet conduit 40 and passed through the bead bed. At this point the reading at block 45 is noted and may be considered a zero point. Then a test liquid containing solute is introduced at inlet conduit 40 and flowed through the bed of beads. If the osmolarity of the test liquid is less than the pure base liquid, the resin will attempt to expand and push piston 32 upwardly. If additional pressure is introduced through valve 47, piston 32 can be moved back downwardly so that the deflection is nullified and the unit is returned to the zero point obtained with the pure base liquid. The increase in pressure required to maintain the constant volume, which can be read at gauge 48, is directly proportional to the differential osmolarity or free energy of the base liquid and the test liquid. Similarly, when additional fluid sample is flowed through the device at constant volume, the additional increase in pressure is a relative measurement of viscosity.

FIG. 4 illustrates an alternative embodiment for measuring change in viscosity by the constant pressure-change in volume technique illustrated in FIG. 2. In this case, instead of a Bourdon type tube, a housing 50 defining a polymer bead chamber 51 therein is utilized. A piston 52 joined with a hollow connecting rod 53 and read out arm 54 is inserted within housing 50 above the beads. Again, a pair of retainer screens 55 and 56 maintains the beads within the area desired. A seal around piston 52 is secured with substantially friction free sealing rings 57. Test fluid is introduced at entrance 58 for passage through the beads and outwardly through hollow connecting arm 53 in the direction of the arrows. Swelling and contraction of the beads causes up and down movement of piston 52 which is translated through arm 54 to a suitable read out system as before. In this case, however, a weight 58 is applied to arm 54 which tends to keep the piston 52 in contact with the bead bed. Expansion in volume of the beads works against the weight force. When the beads contract the weight force tends to move the piston downwardly to the extent permitted by the reduced volume of the bead bed.

In use, chamber 10 is packed with particles under minimum solvent activity (highest solute activity or highest operational osmolality). Thereafter, any increase in solvent activity will cause each spherical particle to attempt to expand in a concentric manner, creating a volume change that is a direct function of the solvent activity (osmolality). Once the solvent activity is determined, introduction of additional solvent at constant volume rate provides a second measurement differing from the solvent activity measurement by an amount corresponding to the relative viscosity. The amount of sample required need only be that necessary to establish constant volume flow. Samples as small as 2 cubic centimeters (volume) and smaller have been heretofore employed.

The following chart represents measurements (in millivolts) for aqueous solutions varying from 0–75 percent by weight of glycerol as the solute. The measurements obtained at zero flow rate represent the solvent activity (osmolality) while the measurements obtained at dv/dt = 0.496 represent the total of solvent activity and viscosity, dv/dt being in milliliters/minute.

| % Glycenol | Temp. °C | MV dv/dt = 0 $P_1$ | MV dv/dt = 0.496 P |
|---|---|---|---|
| 0.0 [H₂O] | 20.3 | 161 | 205 |
| 5.0 | 20.3 | 154 | 199 |
| 30.0 | 21.1 | 116 | 183 |
| 45.0 | 22.0 | 95 | 195 |
| 60.0 | 23.0 | 73 | 245 |
| 75.0 | 24 | 54 | 405 |
| 0.0 (H₂O) | 24 | 162 | 203 |

The present invention provides many other advantages and applications not possible with existing technology. Compared with existing viscometers, the present apparatus is substantially simplified. It utilizes a direct measurement on the solvent phases and does not function by way of an indirect technique. Tests can be accomplished extremely rapidly without destroying the sample. Aside from advantageous application to measurement of viscosity of blood, the present principle of viscosity measurement can be extended to other body fluids and for analytical work in allied fields.

Although the foregoing invention has been described in some detail by way of illustration and example for purposes of clarity of understanding, it is understood that certain changes and modifications may be practiced within the spirit and scope of the invention.

What is claimed is:

1. A method for obtaining a measurement proportional to the viscosity of a fluid relative to other fluids comprising providing a chamber having a plurality of particles, each having a molecular lattice that is swellable but not soluble in said fluid; contacting the particles with said fluid to swell or contract the particles in relation to the activity of the fluid; initially determining the volume occupied by the fluid-contacted particles, subjecting said particles to a constant volume of fluid flow while measuring the change in volume in said particles, said change in volume being directly proportional to the viscosity of the fluid relative to said other fluids.

2. A method for obtaining a measurement proportional to the viscosity of a fluid relative to the free energy of other fluids in accordance with claim 1 wherein said particles are symmetrical and said measuring of the change in particle volume is executed while maintaining a constant pressure.

3. A method in accordance with claim 2 wherein said particles are spherical and formed from a substantially hysteresis-free cross-linked polymer.

4. A method in accordance with claim 3 wherein said polymer is a cross-linked copolymer of a polyvinyl aryl compound and a monovinyl aryl compound.

5. A method in accordance with claim 4 wherein said copolymer is formed from divinyl benzene and styrene.

6. A method in accordance with claim 3 wherein said polymer contains fixed ionic groups and the fluid is water.

7. A method in accordance with claim 3 wherein said polymer is free from fixed ionic groups and the fluid is an organic liquid.

8. A method in accordance with claim 1 and including the steps of contacting said particles with fluid substantially free from solute prior to the initial determination of volume in an amount sufficient to eliminate the effect of any previously used fluids and solutes.

9. A method in accordance with claim 1 wherein said fluid contains solute and constitutes an unknown entity, and including steps of comparing the measured change in volume of the unknown solute-containing fluid with the change in volume of a known fluid in the same environment to determine information about the unknown fluid that is proportional to the free energy thereof.

10. A method for obtaining a measurement proportional to the viscosity of a fluid relative to other fluids comprising providing a chamber having a plurality of particles, each having a molecular lattice that is swellable but not soluble in said fluid; contacting the particles with said fluid to swell or contract the particles in relation to the activity of the fluid; initially determining the pressure of the fluid-contacted particles relative to the chamber, subjecting said particles to a constant volume of fluid flow while measuring the change in pressure of said particles, said change in pressure being directly proportional to the viscosity of the fluid relative to said other fluids.

11. A method for obtaining a measurement proportional to the viscosity of a fluid relative to other fluids in accordance with claim 10 wherein said particles are symmetrical and said measuring of the change in pressure is executed while maintaining a constant volume.

12. A method in accordance with claim 11 wherein said particles are spherical and formed from a substantially hysteresis-free cross-linked polymer.

13. A method in accordance with claim 12 wherein said polymer is a cross-linked copolymer of a polyvinyl aryl compound and a monovinyl aryl compound.

14. A method in accordance with claim 13 wherein said copolymer is formed from divinyl benzene and styrene.

15. A method in accordance with claim 12 wherein said polymer contains fixed ionic groups and the fluid is water.

16. A method in accordance with claim 12 wherein said polymer is free from fixed ionic groups and said fluid is an organic liquid.

17. A method in accordance with claim 10 and including the steps of contacting said particles with fluid substantially free from solute prior to the initial determination of pressure in an amount sufficient to eliminate the effect of any previously used fluids and solutes.

18. A method in accordance with claim 10 wherein said fluid contains solute and constitutes an unknown entity, and including the steps of comparing the measured change in pressure of the unknown solute-containing fluid with the change in pressure of a known fluid in the same environment to determine information about the unknown fluid that is proportional to the free energy thereof.

19. Apparatus for obtaining a measurement proportional to change in the viscosity of a fluid comprising: a chamber containing a plurality of particles, each having a molecular lattice that is swellable but not soluble in said fluid; inlet and outlet means communicating with said chamber for flowing fluid into and out of contact with said particles; constant volume feed means for flowing said fluid through said chamber; and means for measuring changes in volume of said particles at a constant pressure caused by first solvating said particles with said fluid and thereafter flowing said fluid therethrough at constant volume.

20. Apparatus in accordance with claim 19 wherein said chamber contains a plurality of spherical particles formed from a cross-linked copolymer.

21. Apparatus in accordance with claim 20 wherein said copolymer is formed from divinyl benzene and styrene.

22. Apparatus in accordance with claim 19 wherein said means for measuring changes in said particles comprises: a chamber open to the atmosphere for maintaining constant pressure therein; said chamber and particles selected so that the particles substantially fill said chamber; said chamber including a movable member in contact with the surface of the particles; said movable member being adapted to move while remaining in contact with said particles as they swell or contract when contacted with a solvating fluid.

23. Apparatus in accordance with claim 22 wherein said chamber is cylindrical and said movable member functions as a piston within said chamber.

24. Apparatus for obtaining a measurement proportional to the viscosity of a fluid comprising: a chamber containing a plurality of particles, each having a molecular lattice that is swellable but not soluble in said fluid; inlet and outlet means communicating with said chamber for flowing fluid into and out of contact with said particles; constant volume feed means for flowing said fluid through said chamber; and means for measuring changes in pressure of said particles relative to the internal surfaces of said chamber at constant particle volume caused by first solvating said particles with said fluid and thereafter flowing said fluid therethrough at constant volume.

25. Apparatus in accordance with claim 24 wherein said chamber comprises a hollow Bourdon type tube and said movable member comprises a floating retention head on one end of said Bourdon type tube.

26. Apparatus in accordance with claim 24 wherein said means for measuring changes in said particles comprises: a chamber having movable member forming two compartments in the chamber, said particles filling the first of said compartments and a source of gas under controlled pressure being connected to the second of said compartments; swelling and contracting of said particles tending to move said movable member which in turn tends to compress or expand, respectively, the gas in said second compartment.

27. Apparatus in accordance with claim 24 wherein said chamber contains a plurality of spherical particles formed from a cross-linked copolymer.

28. Apparatus in accordance with claim 27 wherein said copolymer is formed from divinyl benzene and styrene.

* * * * *